Figure 1:
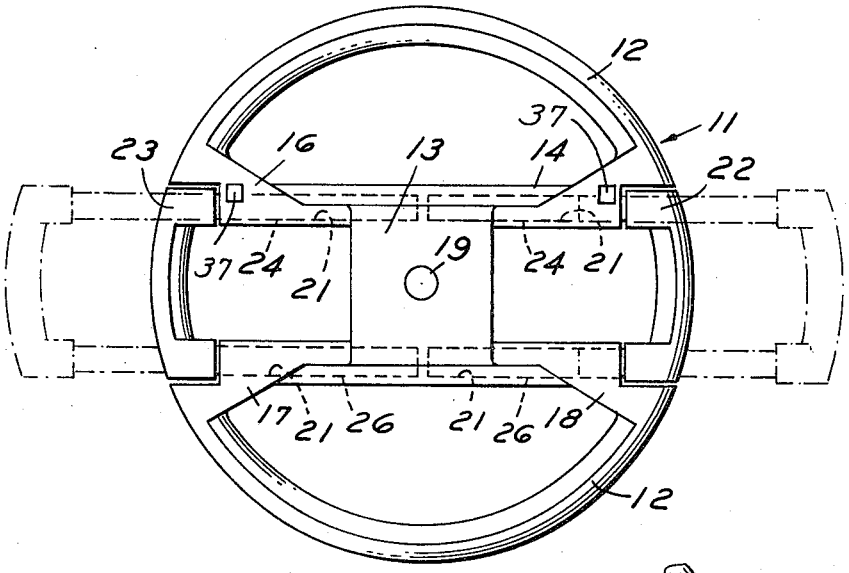
Figure 2:
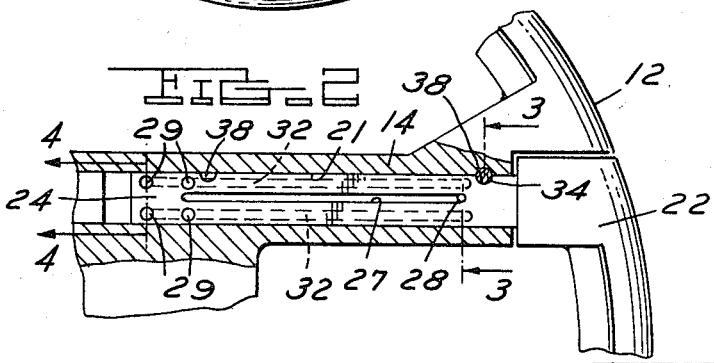
Figure 3:
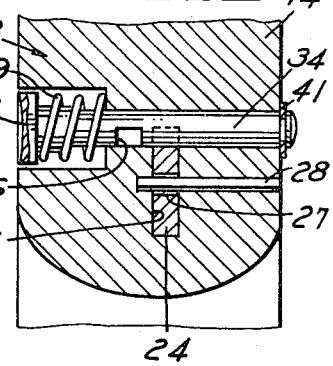
Figure 4:
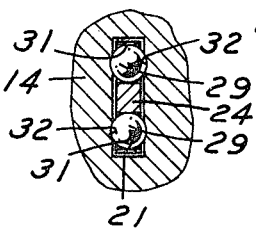
Figure 5:
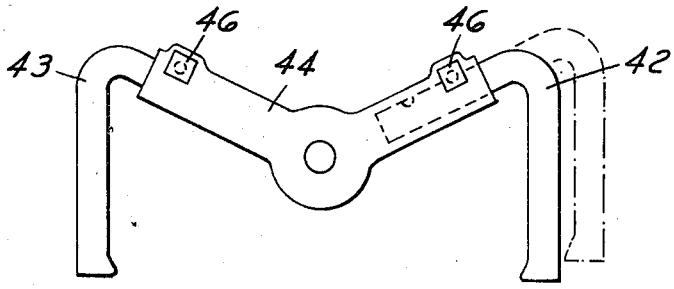

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 23, 1970

875 O.G. 383

T875,019

ADJUSTABLE DIAMETER STEERING WHEEL

Charles J. Haddad, Allen Park, Robert W. Riley, Taylor, and Richard O. Scott, Trenton, Mich., assignors to Ford Motor Company, Dearborn, Mich., a corporation of Delaware

Filed Apr. 3, 1969, Ser. No. 813,200
Int. Cl. B62d *1/04*
U.S. Cl. 74—552
1 Sheet Drawing. 5 Pages Specification

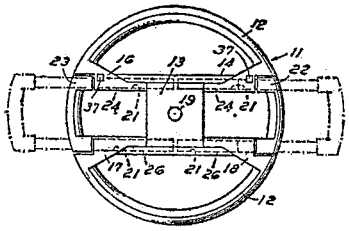

An adjustable steering wheel for an automotive vehicle comprising a hub portion and an annular portion interconnected by a number of spoke members. The annular portion includes two movable arcuate sections slidably connected to the spoke members and which are radially displaceable relative to the remainder of the annular portion. In the displaced position the two movable arcuate sections provide a pair of hand grips having increased radii relative to the normal radius of the annular portion. Lock means are provided which selectively lock the movable sections into normal diameter or increased diameter positions. The lock means are releaseable by the depressing of a thumb button located adjacent each movable section.

An alternate embodiment utilizes a handle-bar type steering "wheel" in which the handle portions are displaceable radially outwardly relative to their normal positions.

June 23, 1970 C. J. HADDAD ET AL T875,019

ADJUSTABLE DIAMETER STEERING WHEEL

Filed April 3, 1969

INVENTORS
CHARLES HADDAD
RICHARD O. SCOTT
BY ROBERT W. RILEY
JOHN R. FAULKNER
ROGER E. ERICKSON
ATTORNEYS